United States Patent
Kimura et al.

(10) Patent No.: US 11,059,446 B2
(45) Date of Patent: Jul. 13, 2021

(54) AIRBAG

(71) Applicant: TOYODA GOSEI CO., LTD., Kiyosu (JP)

(72) Inventors: Yu Kimura, Kiyosu (JP); Norihisa Taya, Kiyosu (JP); Yoshiki Kaneko, Kiyosu (JP); Takashi Shigemura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 149 days.

(21) Appl. No.: 16/574,307

(22) Filed: Sep. 18, 2019

(65) Prior Publication Data
US 2020/0094765 A1 Mar. 26, 2020

(30) Foreign Application Priority Data

Sep. 25, 2018 (JP) .............................. JP2018-179259

(51) Int. Cl.
| B60R 21/206 | (2011.01) |
| B60R 21/2338 | (2011.01) |
| B60R 21/235 | (2006.01) |
| B60R 21/231 | (2011.01) |

(52) U.S. Cl.
CPC ........ *B60R 21/206* (2013.01); *B60R 21/2338* (2013.01); *B60R 2021/23169* (2013.01); *B60R 2021/23576* (2013.01)

(58) Field of Classification Search
CPC ............ B60R 2021/23382; B60R 2021/23324
See application file for complete search history.

(56) References Cited

U.S. PATENT DOCUMENTS

| 10,093,265 | B2* | 10/2018 | Ando ..................... B60R 21/206 |
| 2006/0076758 | A1* | 4/2006 | Yokoyama ............ B60R 21/231 |
| | | | 280/730.1 |
| 2009/0278341 | A1* | 11/2009 | Kim .................... B60R 21/2338 |
| | | | 280/743.2 |
| 2011/0109070 | A1* | 5/2011 | Tanaka ................ B60R 21/2334 |
| | | | 280/741 |
| 2012/0007345 | A1* | 1/2012 | Lee ..................... B60R 21/2176 |
| | | | 280/728.2 |

(Continued)

FOREIGN PATENT DOCUMENTS

| JP | 2005-075142 A | 3/2005 |
| JP | 3868226 B2 | 1/2007 |
| JP | 2017-047744 A | 3/2017 |

*Primary Examiner* — Drew J Brown
(74) *Attorney, Agent, or Firm* — Posz Law Group, PLC

(57) ABSTRACT

An airbag includes a bag body that includes a first panel and a second panel which are opposed to each other, a partitioning tether that is disposed in such a manner as to partition an interior of the bag body, a communication hole that is formed in the tether for providing gas communication in the interior of the bag body, and first and second joints that respectively join first and second edges of the tether to the first and second panels of the bag body. The communication hole has a generally rectangular contour which has two corners in a vicinity of each of the first and second edges of the tether. In both of the first and second edges of the tether, the corners of the communication hole are disposed closer to the first or second edge of the partitioning tether than a corresponding one of the joints.

7 Claims, 10 Drawing Sheets

(56) References Cited

U.S. PATENT DOCUMENTS

| | | | |
|---|---|---|---|
| 2015/0197210 A1* | 7/2015 | Abe | B60R 21/233 280/729 |
| 2016/0288758 A1* | 10/2016 | Ando | B60R 21/231 |
| 2017/0057447 A1 | 3/2017 | Ando | |
| 2017/0247007 A1* | 8/2017 | Lee | B60R 21/2338 |

* cited by examiner

Sectional View taken along line A-A

AIRBAG

CROSS REFERENCE TO RELATED APPLICATIONS

The present application claims priority from Japanese Patent Application No. 2018-179259 of Kimura, filed on Sep. 25, 2018, the entire disclosure of which is incorporated herein by reference.

BACKGROUND

1. Technical Field

The present invention relates to an airbag for a vehicle including a bag body and a partitioning tether that is joined to an outer shell of the bag body in order to partition an interior of the bag body and is provided with a communication hole for providing gas communication between the partitioned sections.

2. Description of Related Art

JP 2017-047744 A discloses a known airbag which includes a partitioning tether that partitions an interior of the bag body and is provided with a communication hole for providing gas communication between the partitioned sections. More particularly, the partitioning tether includes a plurality of generally oval communication holes.

In the above conventional airbag, when a tensile force is exerted in the partitioning tether at airbag deployment, a stress concentration is likely to occur in a vicinity of each of corners of each of the communication holes, which leads to deformation of the contour of each of the communication holes. To prevent such deformation of the communication holes due to stress concentration, the partitioning tether is formed by laminating a plurality of base members for increasing strength. This configuration has a room for improvement in reduction of production cost of the airbag as well as in size reduction of the airbag as folded.

SUMMARY

An object of the present invention is to provide an airbag in which a communication hole formed in a partitioning tether thereof is steadily maintained in shape at airbag deployment, with a simple configuration.

An exemplary embodiment of the invention relates to an airbag which is formed of a flexible sheet-shaped material and includes a bag body that is inflatable with an inflation gas. The bag body includes a first panel and a second panel which are opposed to each other. The airbag also includes at least one partitioning tether that is joined to the first panel and second panel of the bag body in such a manner as to partition an interior of the bag body. The partitioning tether limits a distance between the first panel and second panel at airbag deployment. The partitioning tether includes a first edge and a second edge which are opposed to each other, and at least one communication hole for providing gas communication in the interior of the bag body. A first joint and a second joint respectively join the first edge and second edge of the partitioning tether to the first panel and second panel of the bag body. Each of the at least one communication hole is formed into a generally rectangular contour which has two corners in a vicinity of each of the first and second edges of the partitioning tether. In both of the first and second edges of the partitioning tether, the corners of the communication hole are disposed closer to the first or second edge of the partitioning tether than a corresponding one of the joints.

In the airbag of the above exemplary embodiment, each of the communication holes formed in the partitioning tether is formed into a generally rectangular contour such that its corners are disposed in a vicinity of each of the first and second edges of the partitioning tether. In both of the first and second edges of the partitioning tether, the corners of the communication hole are disposed closer to the first or second edge of the partitioning tether than the corresponding one of the first joint or second joint. In other words, a tensile force is likely to occur in a portion of the partitioning tether disposed between the first and second joints at airbag deployment, but the corners of the communication hole of the exemplary embodiment are dislocated from such a portion. This configuration will prevent a stress concentration from occurring in the corners of the communication holes, such that the communication holes will be steadily maintained in shape at airbag deployment even with no reinforcing member, and the airbag will be inflated quickly in a steady fashion.

Therefore, with the airbag of the exemplary embodiment, the communication holes formed in the partitioning tether are steadily maintained in shape at airbag deployment, with a simple configuration.

In the airbag of the above exemplary embodiment, it is desired that opposite inner edges of each of the at least one communication hole which are disposed between the first joint and second joint are formed into straight lines generally parallel to each other. This configuration will adequately prevent stress concentration from occurring not only at the corners but also in other portions of the inner edge of each of the communication holes.

Further, it is desired that the first and second joints are formed by sewing using sewing threads. This configuration will facilitate the jointing work of the partitioning tether and production of the airbag, in comparison with an instance where a tether component is joined to the first panel and second panel of the bag body with such adhering means as an adhesive.

If a plurality of the communication holes are arranged along a direction generally perpendicular to a direction that the first panel and the second panel of the bag body are opposed, each of the first and second joints may be formed continuously generally along the corresponding edge of the partitioning tether, including portions where the communication holes are disposed. With this configuration, the partitioning tether can be easily joined to the first panel and second panel with one each continuous straight stitch in accordance with the length of the partitioning tether, irrespective of the number of the communication holes.

In another exemplary embodiment of the invention, the partitioning tether is composed of two, first and second base cloths that are joined together by first edges thereof with a center joint. The partitioning tether is joined to the first panel and second panel of the bag body by second edges of the first and second base cloths with two, first and second panel-side joints. At least one communication hole is formed in each of the first and second base cloths. Each of the at least one communication hole in each of the first and second base cloths is formed into a generally rectangular contour such that two corners each of the communication holes are disposed in a vicinity of the center joint and in a vicinity of the first or second panel-side joint. The at least one communication hole of the first base cloth and the at least one communication hole of the second base cloth are so arranged as not to overlap in a joint direction of the first and second base cloths, and arranged in an alternate fashion in a direction extending along the edges of the base cloths. The corners of each of the communication holes disposed in the vicinity of the panel-side joints are disposed closer to the second edge of the base cloths than a corresponding one of the panel-side joints, and the corners of each of the communication holes disposed in the vicinity of the center joint are disposed closer to the first edges of the base cloths than the center joint.

Also in the airbag configured as described above, each of the communication holes of the partitioning tether is formed into a generally rectangular contour, and the corners of the communication holes disposed in a vicinity of the center joint or panel-side joints are not positioned farther towards an interior of the base cloths than the center joint or panel-side joints. In other words, although a tensile force occurs in portions of the partitioning tether disposed between the center joint and panel-side joints at airbag deployment, the corners of the communication holes of the exemplary embodiment are dislocated from such portions. This configuration will prevent a stress concentration from occurring in the corners of the communication holes, such that each of the communication holes will be steadily maintained in shape at airbag deployment even with no reinforcing member, and the airbag will be inflated quickly in a steady fashion.

Therefore, with the airbag of the another exemplary embodiment, the communication holes formed in the partitioning tether are steadily maintained in shape at airbag deployment, with a simple configuration.

DETAILED DESCRIPTION

Exemplary embodiments are described below with reference to the accompanying drawings. However, the invention is not limited to the embodiments disclosed herein. All modifications within the appended claims and equivalents relative thereto are intended to be encompassed in the scope of the claims.

An airbag 20 in accordance with an exemplary embodiment is herein described as used in an airbag device S for knee protection for the illustrative purpose. The airbag device S is mounted beneath a steering column 1 in front of a driver's seat. Interior trim members such as an instrument panel 3 and an undercover 4 are disposed around the airbag device S. Unless otherwise specified, up-down, left-right and front-rear directions in this specification are intended to refer to up-down, left-right and front-rear directions of the vehicle on which the airbag device S is mounted.

Figure 1:
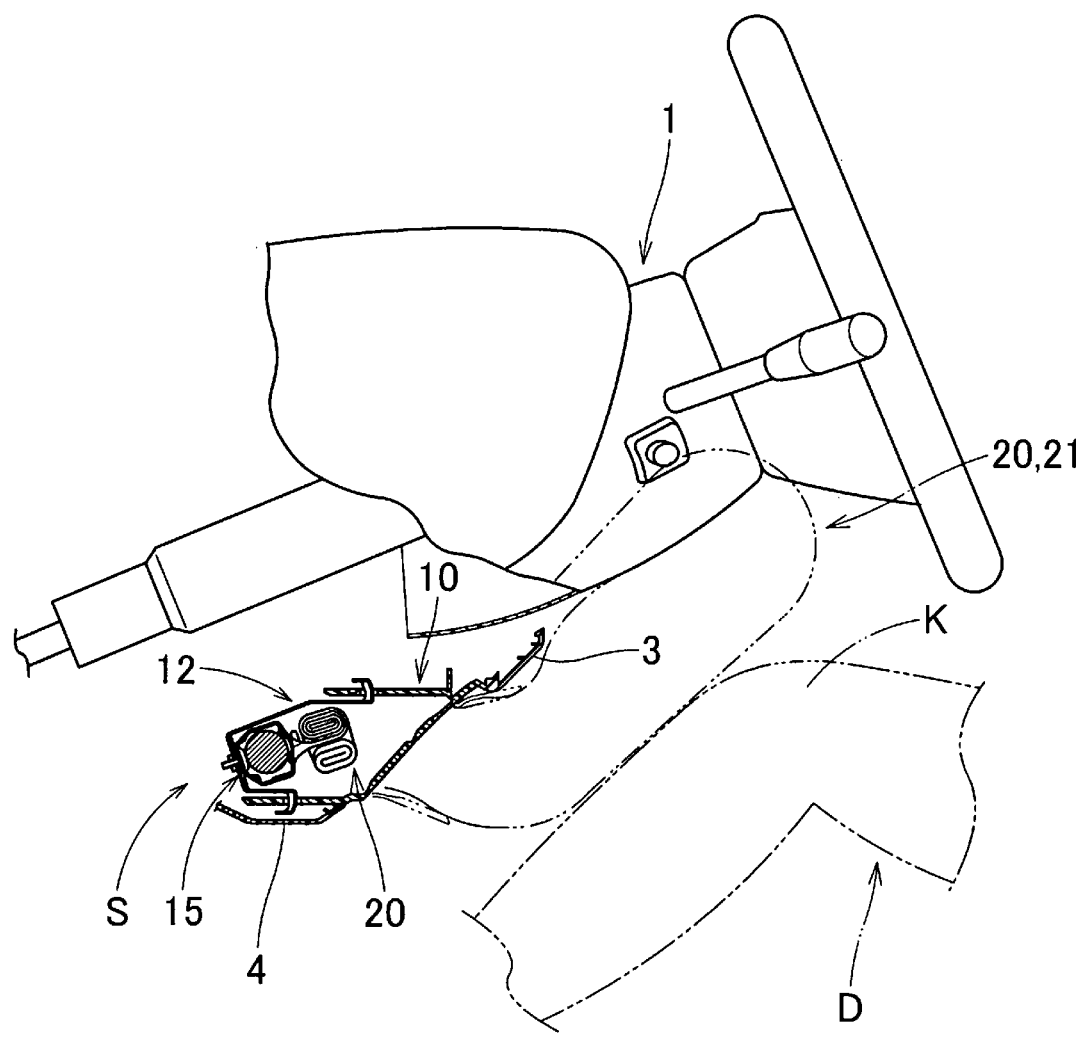
FIG. 1 is a schematic vertical sectional view of an airbag device for knee protection in service taken along a front and rear direction of a vehicle, the airbag device employing an airbag in accordance with an exemplary embodiment.
Figure 2:
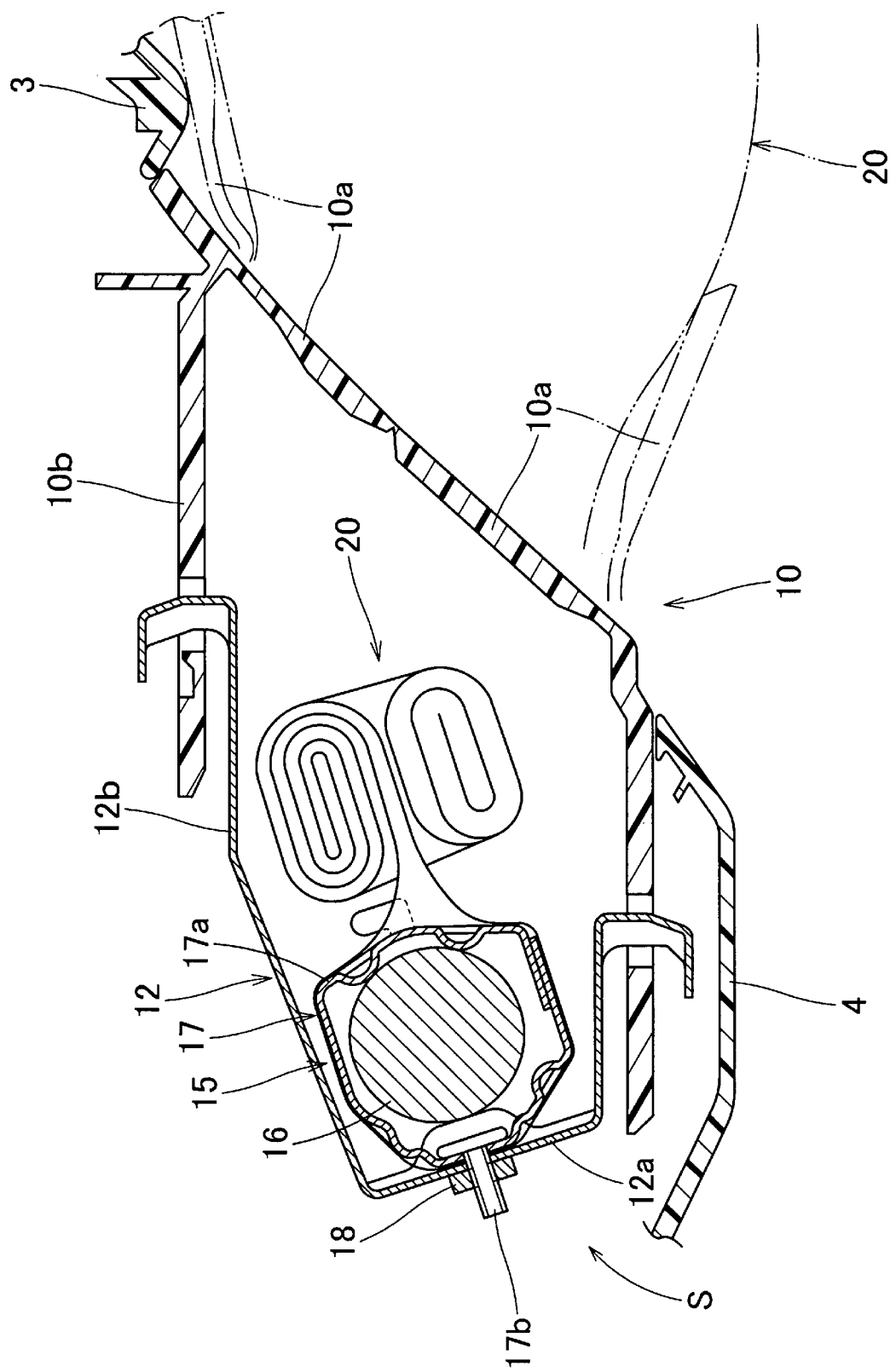
FIG. 2 is a schematic enlarged vertical sectional view of the airbag device of FIG. 1 taken along the front and rear direction of the vehicle.

As shown in FIGS. 1 and 2, the airbag device S includes an airbag 20, which is folded, an inflator 15 for feeding the airbag 20 with an inflation gas, a case 12 for storing the airbag 20 and inflator 15, and an airbag cover 10 for covering the rear side of the airbag 20.

The airbag cover 10 is fabricated from thermoplastic elastomer of polyolefin, and covers the rear side of the case 12. As can be seen in FIG. 2, the airbag cover 10 includes a door 10a which covers an opening of the case 12, and a circumferential wall 10b that extends forward from a periphery of the door 10a for coupling with the case 12. The door 10a of the illustrated embodiment is a double door which is openable upward and downward.

The case 12 is fabricated of a sheet metal. As shown in FIG. 2, the case 12 includes a generally quadrangular bottom wall 12a which is disposed at a front side, and a generally square tubular circumferential wall 12b which extends rearward from the peripheral edge of the bottom wall 12a generally along a front and rear direction. The rear end of the circumferential wall 12b is open to allow the airbag 20 to be deployed therefrom. Although not shown in the drawings in detail, the case 12 is mounted on a dashboard reinforcement (i.e. vehicle body structure) through the use of one or more brackets.

As can be seen in FIG. 2, the inflator 15 includes a generally cylindrical body 16 and a retainer 17 which holds the inflator body 16. The inflator body 16 is adapted to be disposed generally along a left and right direction of the vehicle. Although not depicted in the drawings, the inflator body 16 includes a plurality of gas discharge ports for discharging an inflation gas at the first end. A lead wire for feeding an actuating signal is connected to the second end of the inflator body 16. The retainer 17 includes a generally tubular holding section 17a which is mounted around the inflator body 16 and one or more bolts 17b which protrude in a direction generally perpendicular to an axial direction of the holding section 17a. The retainer 17 of the illustrated embodiment is provided with two bolts 17b arranged along the axial direction of the holding section 17a, though not depicted in the drawings. In the illustrated embodiment, the inflator 15 and airbag 20 are mounted on the case 12 by firstly inserting the retainer 17 into the airbag 20 such that the bolts 17b protrude from the airbag 20, folding the airbag 20, inserting the inflator body 16 into the holding section 17a of the retainer 17 inside the airbag 20, then placing the airbag 20 and inflator 15 in the case 12 such that the bolts 17b of the retainer 17 go through the bottom wall 12a of the case 12, and then fastening the bolts 17b with nuts 18.

Figure 3:
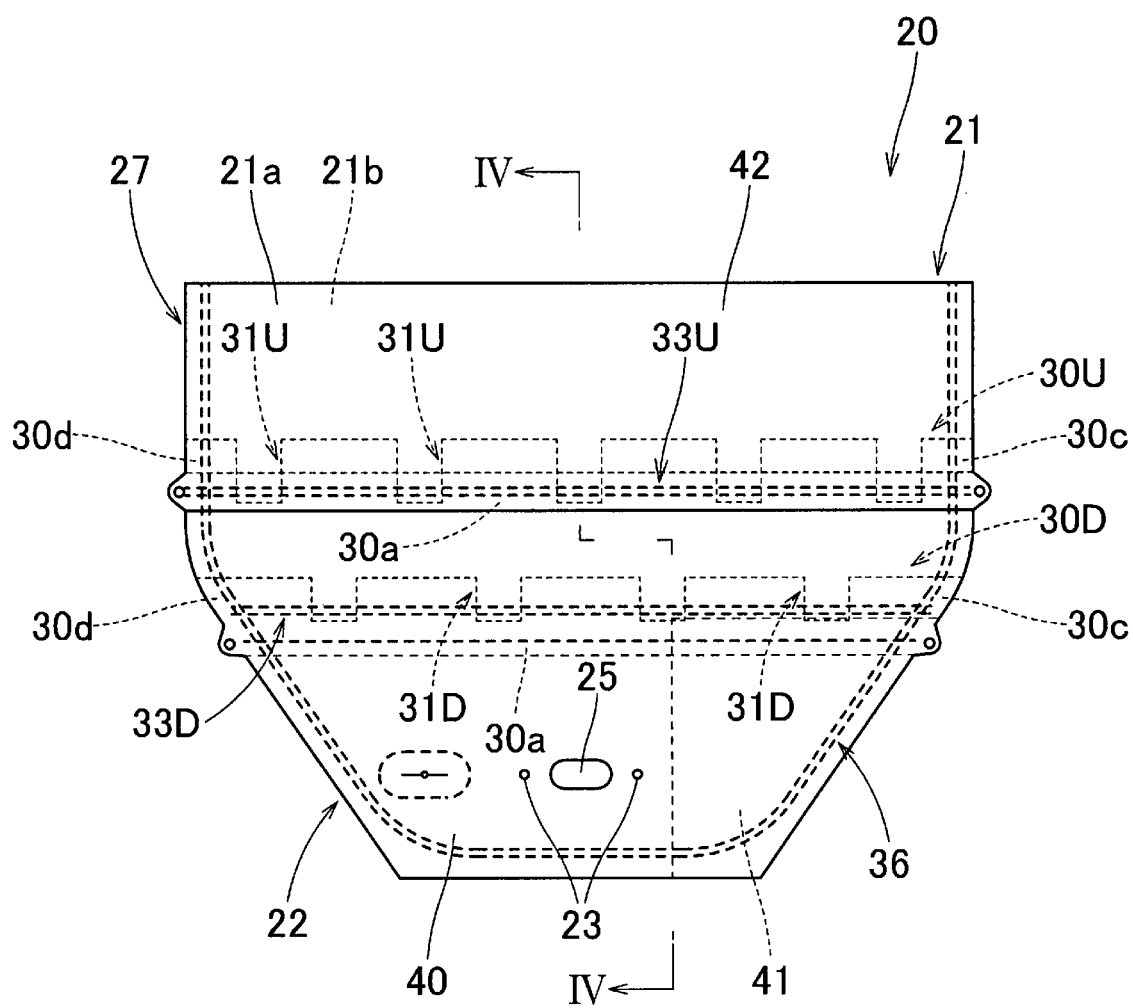
FIG. 3 is a back view of the airbag in accordance with the exemplary embodiment as laid flat in an unfolded state.
Figure 4:
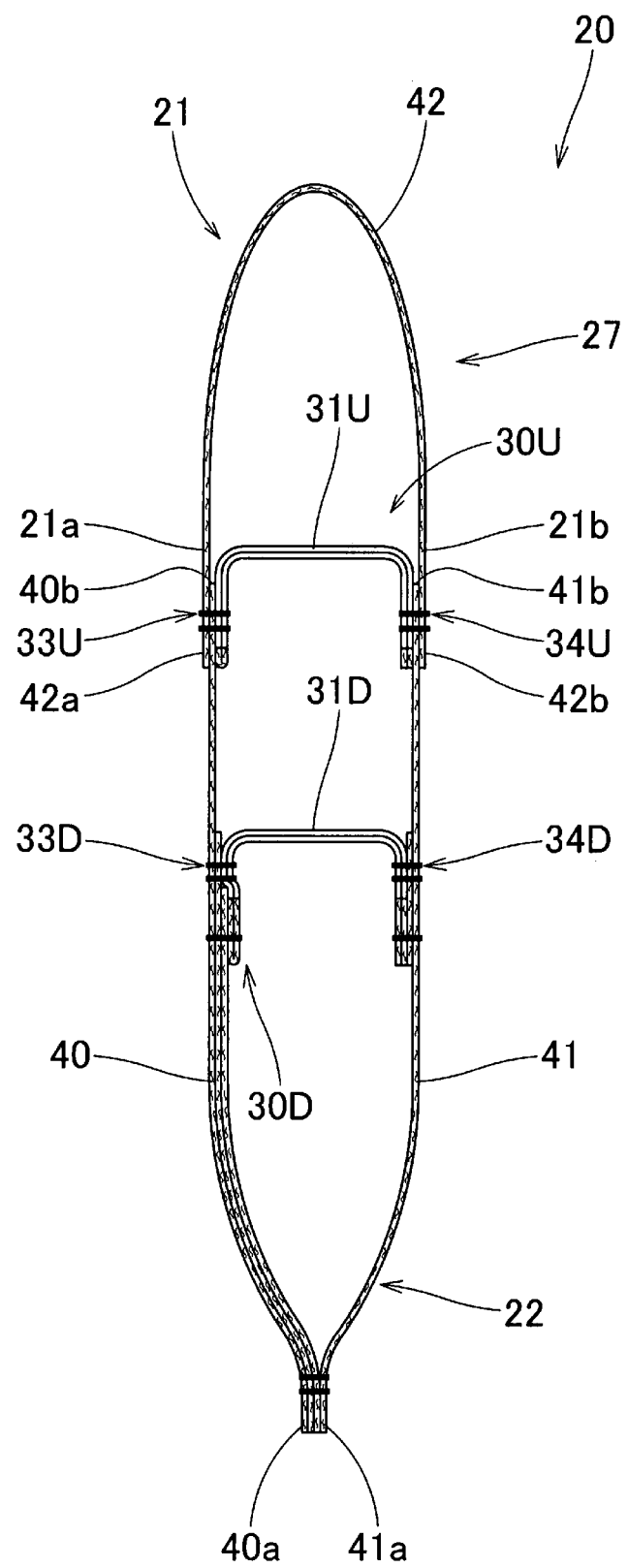
FIG. 4 is a sectional view taken along line IV-IV of FIG. 3.

As shown in FIGS. 3 and 4, the airbag 20 includes a bag body 21 which is formed into a bag, and two partitioning tethers 30 (30U, 30D) each of which partitions an interior of the bag body 21.

The bag body 21 is designed to be inflated into a generally rectangular board and be deployed for protecting left and right knees of a driver D, as indicated with double-dotted lines in FIG. 1. As can be seen in FIG. 3, the bag body 21 is formed by joining together peripheral edges of a vehicle-side wall 21a (as a first panel) which is deployable towards the steering column 1 and an occupant-side wall 21b (as a second panel) which is deployable towards the driver D. The vehicle-side wall 21a and the occupant-side wall 21b are generally identical in outer contour. The bag body 21 includes a mounting portion 22 which stays inside the case 12 as the airbag 20 is deployed, and a protection portion 27 which is inflatable and disposed above the mounting portion 22 at airbag deployment for protecting the knees K of the driver D. The protection portion 27 has a greater width in the left and right direction than the mounting portion 22.

As shown in FIG. 3, the vehicle-side wall 21a is provided, in the mounting portion 22, with two apertures 23 for receiving the bolts 17b of the retainer 17, a slit 24 which is used to insert the retainer 17 and inflator body 16 into the bag body 21, and a through hole 25 for receiving a not-shown supporting projection formed in the bottom wall 12a of the case 12.

The airbag 20 of the illustrated embodiment includes two partitioning tethers 30 (30U, 30D) one above the other. More specifically, a partitioning tether 30D is disposed on the lower side to partition the mounting portion 22 from the protection portion 27, and a partitioning tether 30U is disposed on the upper side to partition the protection portion 27 into upper and lower sections. The partitioning tethers 30U, 30D are each joined to the vehicle-side wall 21a and occupant-side wall 21b by a generally entire outer circumferential edge so as to limit a distance between the vehicle-side wall 21a and occupant-side wall 21b at airbag deployment. In the illustrated embodiment, opposite edges 30a, 30b in the width direction (in other words, first and second edges 30a, 30b in the width direction) of each of the partitioning tethers 30U, 30D are respectively entirely joined to the vehicle-side wall 21a and occupant-side wall 21b with a first joint (sewn seam) 33U, 33D, and a second joint (sewn seam) 34U, 34D each of which is formed into a continuous straight line, as shown in FIG. 3. Opposite edges 30c, 30d in the length direction (in other words, first and second edges 30c, 30d in the length direction) of each of the partitioning tethers 30U, 30D are respectively sewn to the vehicle-side wall 21a and occupant-side wall 21b with an edge seam 36 that sews outer peripheral edges of the vehicle-side wall 21a and occupant-side wall 21b together with sewing threads for forming the bag body 21 into a bag shape.

Each of the partitioning tethers 30 (30U, 30D) is provided with a plurality of communication holes 31 (31U, 31D) for providing gas communication inside the bag body 21. In the illustrated embodiment, the upper partitioning tether 30U includes five communication holes 31U along the left and right direction, while the lower partitioning tether 30D includes four communication holes along the left and right direction.

Figure 5:
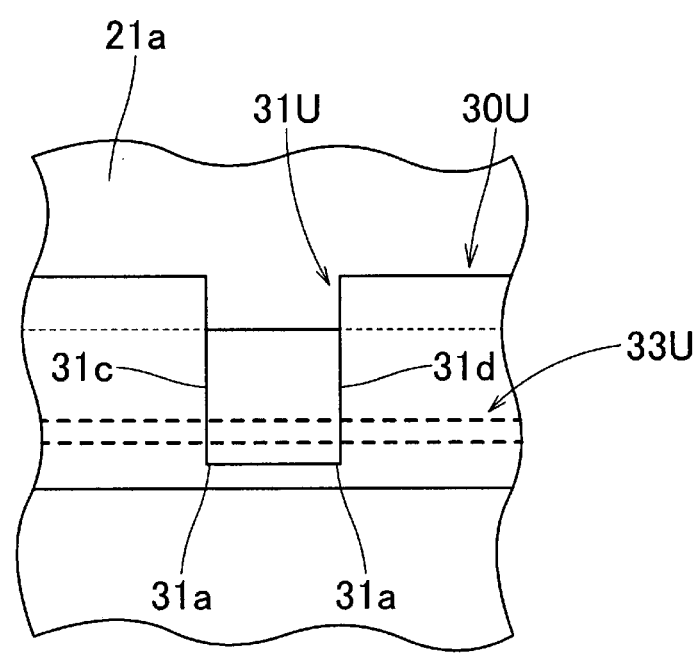
FIG. 5 is an enlarged view of a part of the airbag of FIG. 3 as viewed from an interior of a bag body, showing a vicinity of a joint of an edge of one partitioning tether and a bag body.
Figure 6:
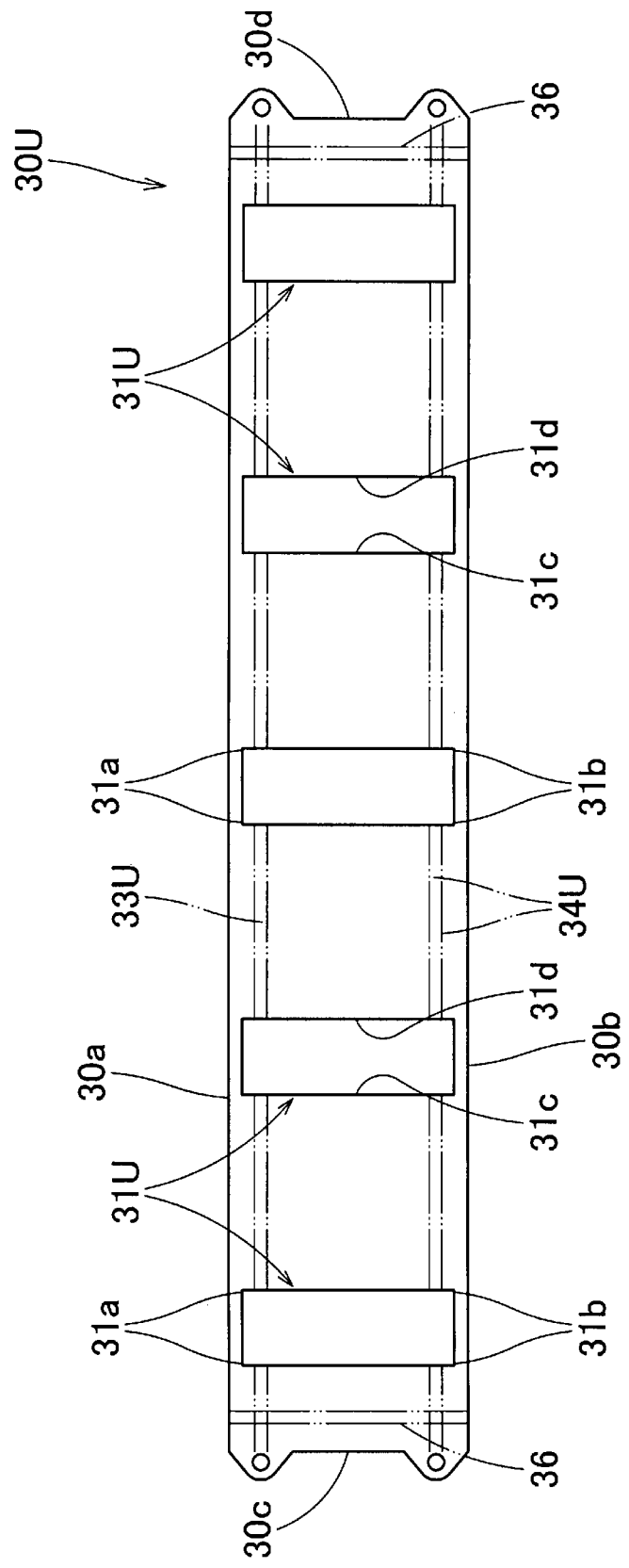
FIG. 6 is an enlarged plan view of the partitioning tether as laid flat.

The communication holes 31 (31U, 31D) have a generally identical, generally rectangular contour, as shown in FIG. 6. In the illustrated embodiment, each of the communication holes 31U, 31D is formed into such a rectangular contour that is elongated in the width direction of the partitioning tether 31U, 31D. Referring to FIGS. 5 and 6, each of the communication holes 31U, 31D is so configured that its corners 31a, 31b are respectively disposed farther towards (or closer to) the first and second edges 30a, 30b than the first joint 33U, 33D and second joint 34U, 34D, which join the edges 30a, 30b of each of the partitioning tethers 30U, 30D to the vehicle-side wall 21a or occupant-side wall 21b. To describe more specifically, in the illustrated embodiment, each of the joints 33U, 33D, 34U, 34D is continuously formed generally along the edge 30a, 30b of the partitioning tether 30U, 30D including portions where the communication holes 31U, 31D are disposed, as shown in FIG. 3. That is, each of the communication holes 31U, 31D is so formed as to open an area in the partitioning tether 30U/30D between the vehicle-side wall 21a and occupant-side wall 21b entirely at airbag deployment. At portions where the communication holes 31U, 31D are not disposed, each of the joints 33U, 33D, 34U, 34D joins the tether 30U or 30D to the vehicle-side wall 21a or occupant-side wall 21b. On the other hand, at portions where the communication holes 31U, 31D are disposed, each of the joints 33U, 33D, 34U, 34D is formed only on the vehicle-side wall 21a or occupant-side wall 21b. The joints 33U, 33D, 34U, 34D are disposed farther towards the interior than the corners 31a and 31b of the communication holes 31U, 31D. Further, opposite inner edges 31c and 31d of each the communication holes 31 (31U, 31D) which are disposed between the first joint 33 (33U, 33D) and second joint 34 (34U, 34D) are formed into straight lines which are parallel to each other and generally orthogonal to the joints 33 and 34, as shown in FIG. 6. That is, in the illustrated embodiment, each of the communication holes 31U, 31D has, in portions of the inner edges 31c and 31d disposed between the first joint 33 (33U, 33D) and second joint 34 (34U, 34D), no such curving portion that is likely to induce stress concentration at airbag deployment.

Figure 7:
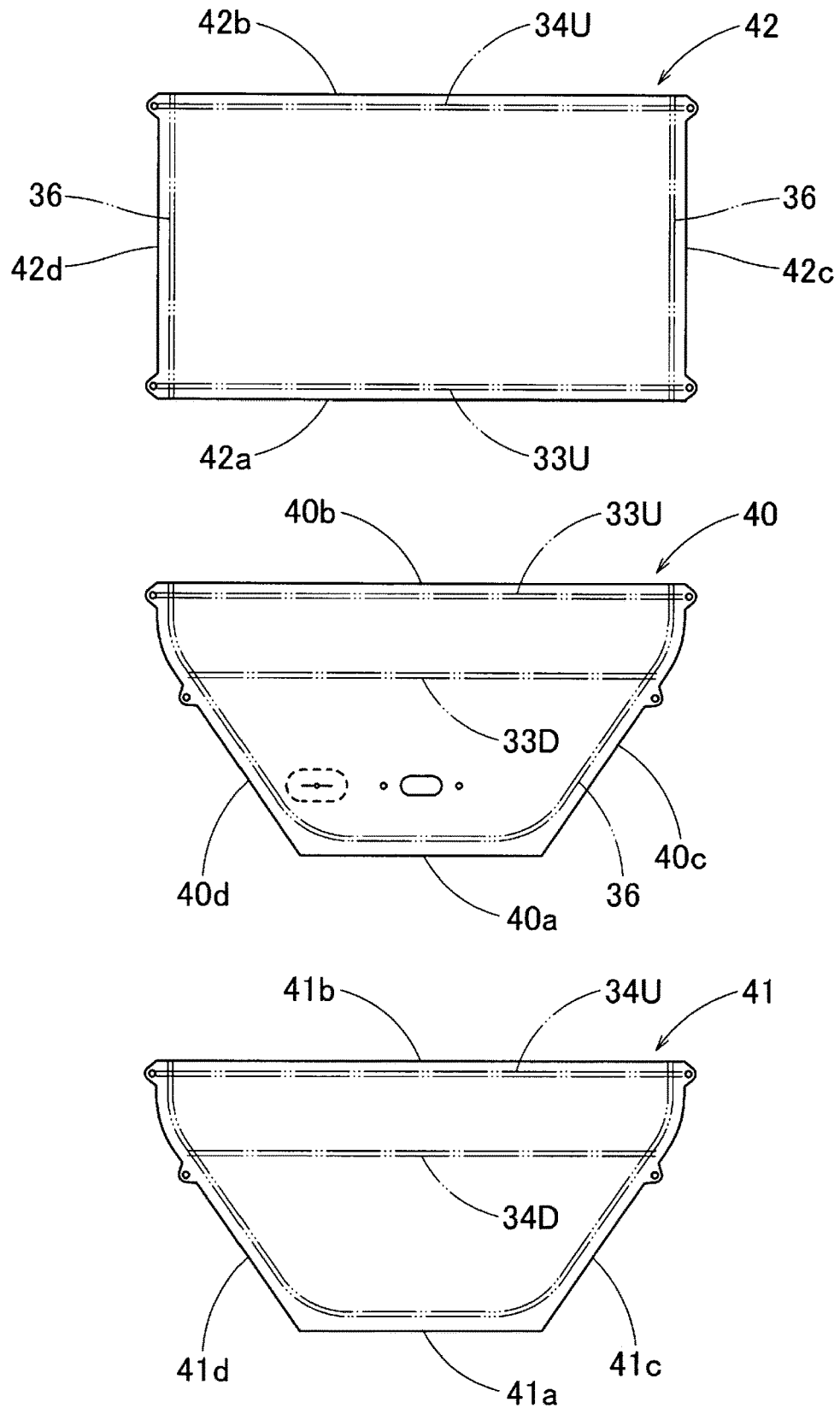
FIG. 7 depicts base members of the bag body of the airbag of FIG. 3 in plan.
Figure 8:
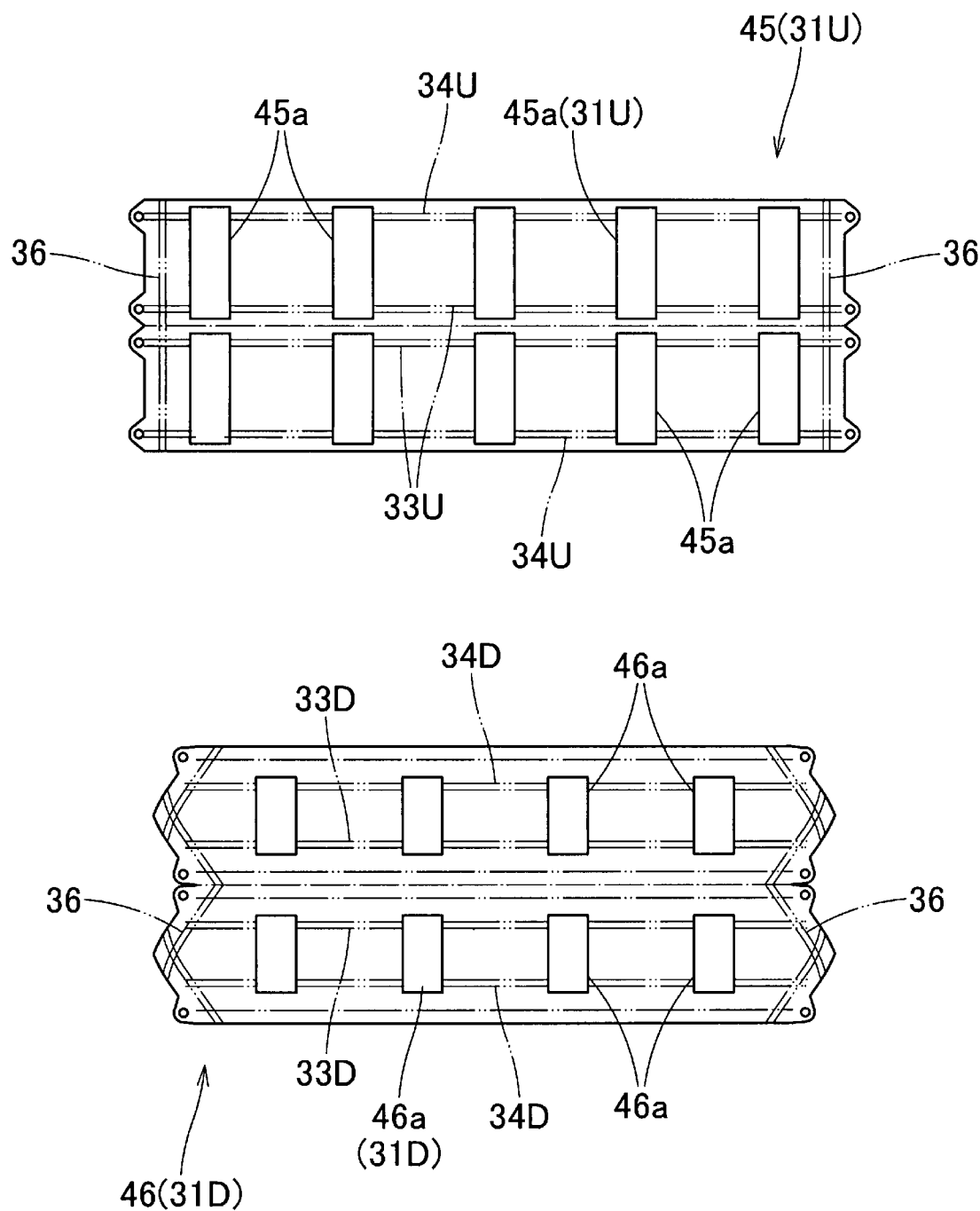
FIG. 8 depicts base members of two partitioning tethers for use in the airbag of FIG. 3 in plan.

In the illustrated embodiment, the airbag 20 is composed of a plurality of base members which are formed of a flexible fabric woven with polyester yarns, polyamide yarns or the like and cut into predetermined shapes. The airbag 20 is formed by sewing the base members together with sewing threads. The airbag 20 of the illustrated embodiment is composed of three body base members 40, 41, 42 for forming the vehicle-side wall 21a and occupant-side wall 21b of the bag body 21, and two base members 45, 46 for forming the partitioning tethers 30U, 30D, respectively, as can be seen in FIGS. 7 and 8.

The body base members 40 and 41 are each formed into a generally trapezoidal contour. As shown in FIGS. 3, 4 and 7, the body base members 40, 41 respectively form portions of the vehicle-side wall 21a and occupant-side wall 21b from the mounting portion 22 to the location of the upper partitioning tether 30U (in other words, portions of the vehicle-side wall 21a and occupant-side wall 21b below the upper partitioning tether 30U). The body base cloth 42 is formed into a generally rectangle and forms portions of the vehicle-side wall 21a and occupant-side wall 21b above the partitioning tether 30U. The tether base cloths 45, 46 respectively form the partitioning tethers 30U, 30D in a half folded state, and are each provided with a plurality of openings 45a, 46a for forming the communication holes 31U, 31D, as shown in FIG. 8.

In the airbag 20 of the illustrated embodiment, the upper partitioning tether 30U is joined to the vehicle-side wall 21a and occupant-side wall 21b as follows: As shown in FIGS. 3 and 4, when an upper front edge 42a of the body base cloth 42 and a rear edge 40b of the body base cloth 40 are mated and joined together, the first edge 30a in the width direction of the partitioning tether 30U is placed on the inner side of the upper front edge 42a and rear edge 40b as mated and sewn together with the upper front edge 42a and rear edge 40b with sewing threads, thus forming the first joint 33U. In a similar fashion, when a lower front edge 42b of the body base cloth 42 and a rear edge 41b of the body base cloth 41 are mated and joined together, the second edge 30b in the width direction of the partitioning tether 30U is placed on the inner side of the lower front edge 42b and rear edge 41b as mated and sewn together with the lower front edge 42b and rear edge 41b with sewing threads, thus forming the second joint 34U. The lower partitioning tether 30D is sewn to central portions in the front and rear direction of the body base cloths 40 and 41 with sewing threads. More specifically, the first and second edges 30a and 30b of the lower partitioning tether 30D are respectively placed on the inner surface of the body base cloths 40 and 41, and sewn thereto, thus forming the first and second joints 33D and 34D. After the body base cloths 40, 41 and 42 were joined in tandem and the partitioning tethers 30U and 30D were joined to the body base cloths 40, 41 and 42, the bag body 21 is formed by sewing up the left edge 42c and right edge 42d of the body base cloth 42, and sewing the left edges 40c and 41c, front edges 40a and 41a, and right edges 40d and 41d of the body base cloths 40 and 41 together with sewing threads continuously. At this time, the edge seam 36 is formed, and the edge seam 36 joins the opposite edges 30c and 30d in the length direction of the partitioning tethers 30U and 30D to the bag body 21.

The airbag 20 of the illustrated embodiment is mounted on the vehicle as follows: Firstly, the retainer 17 is inserted into the airbag 20, and the airbag 20 is folded up so as to fit in the case 12. Then the inflator body 16 is inserted into the airbag 20, and the airbag 20 as housing the inflator 15 is stored in the case 12. The airbag cover 10 is mounted on the case 12, and the case 12 is mounted on the vehicle body structure. Thus the airbag device S is mounted on the vehicle.

After the airbag device S was mounted on the vehicle, if an actuating signal is fed to the inflator 15, the inflator body 16 will emit an inflation gas into the airbag 20. Then the airbag 20 will be inflated with the inflation gas and push open the door 10a of the airbag cover 10, then protrude from the case 12 and be deployed rearwardly, as indicated by double-dotted lines in FIG. 1.

In the airbag 20 of the illustrated embodiment, in each of the partitioning tethers 30U and 30D, each of the communication holes 31 is formed into a generally rectangular contour such that two each corners 31a, 31b are disposed in a vicinity of each of the first and second edges 30a and 30b of the partitioning tether 30. In both of the first and second edges 30a and 30b of the partitioning tether 30, the corners 31a, 31b of the communication hole 31 are disposed closer to the first or second edge 30a/30b of the partitioning tether 30 than the corresponding joint 33/34 that joins the first or second edge 30a/30b of the partitioning tether 30 to the first panel (vehicle-side wall 21a) or the second panel (occupant-side wall 21b) of the bag body 21. In other words, a tensile force is likely to occur in a portion of the partitioning tether 30 disposed between the first and second joints 33 and 34 at airbag deployment, but the corners 31a and 31b of each of the communication holes 31 of the illustrated embodiment are dislocated from such a portion. This configuration will prevent a stress concentration from occurring in the corners 31a and 31b of each of the communication holes 31, such that each of the communication holes 31 will be steadily maintained in shape at airbag deployment even with no reinforcing member, and the airbag 20 will be inflated quickly in a steady fashion.

Therefore, with the airbag 20 of the illustrated embodiment, the communication holes 31 formed in the partitioning tether 30 are steadily maintained in shape at airbag deployment, with a simple configuration.

In the airbag of the illustrated embodiment, in each of the communication holes 31 (31U, 31D) of the partitioning tethers 30 (30U, 30D), the opposite inner edges 31c and 31d of the communication hole 31 disposed between the first and second joints 33 and 34 are formed into straight lines generally parallel to each other. This configuration will adequately prevent stress concentration from occurring not only at the corners but also in other portions of the inner edge of the communication hole 31. However, the inner edges of the communication hole disposed between the first and second joints do not absolutely necessarily have to be straight. The inner edges may be slightly curving to such a degree as not to cause stress concentration.

Moreover, in the airbag 20 of the illustrated embodiment, the first joint 33 (33U, 33D) and second joint 34 (34U, 34D) are formed by sewing using sewing threads. This configuration will facilitate the jointing work of the partitioning tethers and production of the airbag 20, in comparison with an instance where a tether component (such as base cloths 45, 46) is joined to the vehicle-side wall 21a and occupant-side wall 21b of the bag body 21 with adhering means like an adhesive, by way of example. If such an advantageous effect does not have to be considered, the tether may be joined to the bag body with such an adhering means as adhesive.

Furthermore, in the airbag 20 of the illustrated embodiment, although a plurality of the communication holes 31 (31U, 31D) are arranged along a direction generally perpendicular to the direction that the vehicle-side wall 21a and occupant-side wall 21b are opposed (i.e. along the length direction of the partitioning tether 30 (30U, 30D), each of the first and second joints 33 and 34 (33U, 33D, 34U, 34D) is formed continuously generally along the corresponding edge 30a, 30b of the partitioning tether 30, including portions where the communication holes 31 are disposed. With this configuration, the partitioning tether 30 can be easily joined to the vehicle-side wall 21a and occupant-side wall 21b with one each continuous straight stitch in accordance with the length of the partitioning tether 30, irrespective of the number of the communication holes 31. If such an advantageous effect does not have to be considered, the joint may be formed intermittently skipping the communication holes.

Figure 9:
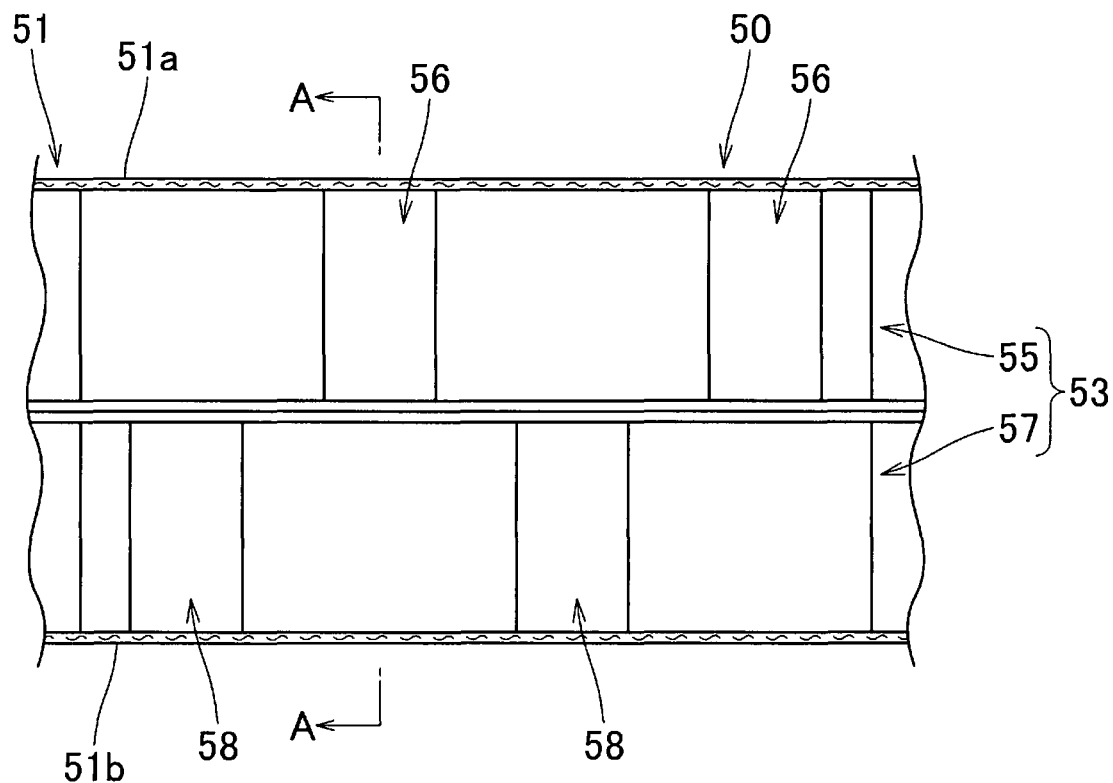
FIG. 9 is a schematic partial enlarged cross sectional view of an airbag in accordance with another exemplary embodiment taken along the location of a partitioning tether.
Figure 9:
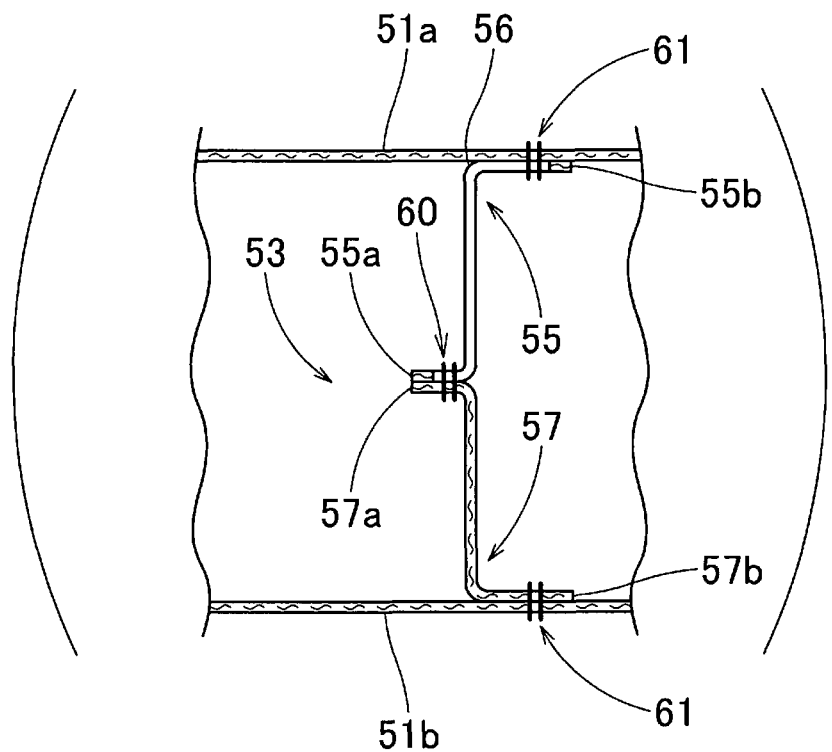
Figure 10:
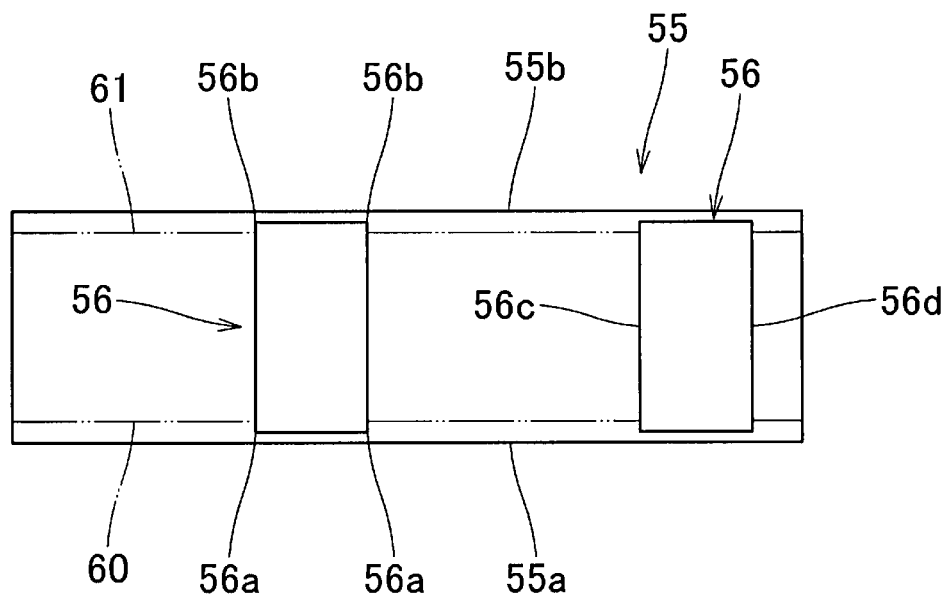
FIG. 10 depicts base members for forming the partitioning tether for use in the airbag of FIG. 9 in plan.
Figure 10:
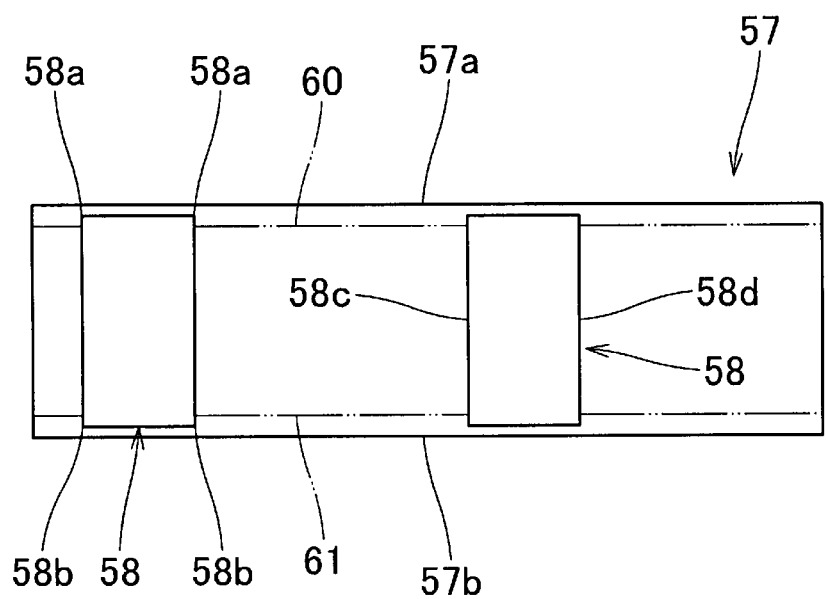

Although the partitioning tether 30 (30U, 30D) of the foregoing embodiment is joined to the vehicle-side wall 21a and occupant-side wall 21b of the bag body 21 by the opposite edges 30a and 30b, the partitioning tether may alternatively be configured like a partitioning tether 53 depicted in FIG. 9. The partitioning tether 53 is disposed in a bag body 51 of an airbag 50. As shown in FIG. 10, the partitioning tether 53 is composed of two base cloths 55 and 57. To describe more specifically, the partitioning tether 53 is formed by joining first edges 55a and 57a of the base cloths 55 and 57 with a center joint 60, and joined to a first panel 51a and a second panel 51b constituting the bag body 51 by second edges 55b and 57b of the base cloths 55 and 57, with panel-side joints 61. Each of the tether base cloths 55 and 57 is provided with two communication holes 56 and 58 each of which is formed into a generally rectangular contour. As shown in FIG. 9, the communication holes 56 and 58 are so arranged as not to overlap in a joint direction of the base cloths 55 and 57 (i.e. in a width direction of the partitioning tether 53), and arranged in an alternate fashion (or at dislocated positions) in a direction extending along the edges 55a, 55b, 57a, 57b (i.e. along a length direction of the partitioning tether 53). The communication holes 56 and 58 have a generally identical contour. In the illustrated embodiment, each of the communication holes 56 and 58 is formed into such a contour that is elongated in a width direction of each of the base cloths 55 and 57, and is so configured that its corners 56a, 56b, 58a, 58b are disposed farther towards (or closer to) the edge 55a, 55b, 57a, 57b than the center joint 60 or panel-side joints 61, as shown in FIG. 10. In the partitioning tether 53 as well, the center joint 60 that joins the first edges 55a and 57a of the base cloths 55 and 57 together and the panel-side joints 61 that join the second edges 55b and 57b of the base cloths 55 and 57 to the first panel 51a and second panel 51b respectively are continuously formed generally along the edges 55a, 55b, 57a, 57b of the base cloths 55 and 57 including portions where the communication holes 56 and 58 are disposed. Further, in the partitioning tether 53, the center joint 60 or panel-side joints 61 are disposed farther towards an interior than the corners 56a, 56b, 58a, 58b of the communication holes 56, 58, and inner edges 56c and 56d/58c and 58d of each of the communication holes 56, 58 which are disposed between the center joint 60 and panel-side joints 61 are formed into straight lines which are parallel to each other and generally orthogonal to the center joint 60 and panel-side joints 61. That is, in the partitioning tether 53 configured as described above as well, each of the communication holes 56, 58 has, in portions of the inner edges 56c, 56d, 58c, 58d disposed between the center joint 60 and panel-side joints 61, no such curving portion that is likely to cause stress concentration at airbag deployment.

In the airbag 50 configured as described above as well, each of the communication holes 56, 58 of the partitioning tether 53 is formed into a generally rectangular contour, and the corners 56a, 56b, 58a, 58b of the communication holes 56, 58 disposed in a vicinity of the center joint 60 or panel-side joints 61 are not positioned farther towards an interior of the base cloths 55, 57 than the center joint 60 or panel-side joints 61. In other words, although a tensile force occurs in portions of the partitioning tether 53 disposed between the center joint 60 and panel-side joints 61 at airbag deployment, the corners 56a, 56b, 58a, 58b of the communication holes 56, 58 are dislocated from such portions. This configuration will prevent a stress concentration from occurring in the corners 56a, 56b, 58a, 58b of the communication holes 56, 58, such that each of the communication holes 56, 58 will be steadily maintained in shape at airbag deployment even with no reinforcing member, and the airbag 50 will be inflated quickly in a steady fashion.

Therefore, with the airbag 50 of the illustrated embodiment, the communication holes 56, 58 formed in the partitioning tether 53 are steadily maintained in shape at airbag deployment, with a simple configuration.

Also in the airbag 50, in each of the communication holes 56 and 58, the opposite inner edges 56c, 56d, 58c and 58d disposed between the center joint 60 and panel-side joints 61 are formed into straight lines generally parallel to each other. This configuration will adequately prevent stress concentration from occurring not only at the corners but also in other portions of the inner edge of each of the communication holes 56 and 58. Moreover, the center joint 60 and panel-side joints 61 of the partitioning tether 53 are formed by sewing using sewing threads in the airbag 50, too, and the center joint 60 and panel-side joints 61 are continuously formed generally along the edges 55a, 55b, 57a, 57b of the base cloths 55 and 57 including portions where the communication holes 56 and 58 are disposed. This configuration will facilitate production of the airbag 50.

The airbag 20 has been described as used for the airbag device for knee protection. However, the application of the invention should not be limited thereby. The invention may be suitable for any airbags which are inflatable in a board shape, such as an airbag for side impact, an airbag for pedestrian protection, or the like.

What is claimed is:

1. An airbag adapted to be mounted on a vehicle, comprising:
    a bag body that is formed of a flexible sheet-shaped material and inflatable with an inflation gas, the bag body including a first panel and a second panel which are opposed to each other;
    at least one partitioning tether that is formed of a flexible sheet-shaped material and joined to the first panel and second panel of the bag body in such a manner as to partition an interior of the bag body for limiting a distance between the first panel and second panel at airbag deployment, the partitioning tether including a first edge and a second edge which are opposed to each other;
    at least one communication hole that is formed in the partitioning tether for providing gas communication in the interior of the bag body; and
    a first joint and a second joint that respectively join the first edge and second edge of the partitioning tether to the first panel and second panel of the bag body,
    wherein each of the at least one communication hole is formed into a generally rectangular contour which has two corners in a vicinity of each of the first and second edges of the partitioning tether; and
    wherein, in both of the first and second edges of the partitioning tether, the corners of the communication hole are disposed closer to the first or second edge of the partitioning tether than a corresponding one of the joints.

2. The airbag of claim 1, wherein opposite inner edges of each of the at least one communication hole which are disposed between the first joint and second joint are formed into straight lines generally parallel to each other.

3. The airbag of claim 1, wherein the first and second joints are formed by sewing using sewing threads.

4. The airbag of claim 3, wherein:
    a plurality of the communication holes are arranged along a direction generally perpendicular to a direction that the first panel and the second panel of the bag body are opposed; and
    each of the first and second joints is formed continuously generally along the corresponding edge of the partitioning tether, including portions where the communication holes are disposed.

5. An airbag adapted to be mounted on a vehicle, comprising:
    a bag body that is formed of a flexible sheet-shaped material and inflatable with an inflation gas, the bag body including a first panel and a second panel which are opposed to each other; and
    at least one partitioning tether that is joined to the first panel and second panel of the bag body in such a manner as to partition an interior of the bag body for limiting a distance between the first panel and second panel at airbag deployment,
    wherein the partitioning tether is composed of two, first and second base cloths that are joined together by first edges thereof with a center joint;
    wherein the partitioning tether is joined to the first panel and second panel of the bag body by second edges of the first and second base cloths with two, first and second panel-side joints;

wherein at least one communication hole is formed in each of the first and second base cloths for providing gas communication in the interior of the bag body;

wherein each of the at least one communication hole in each of the first and second base cloths is formed into a generally rectangular contour such that two corners each of the communication holes are disposed in a vicinity of the center joint and in a vicinity of the first or second panel-side joint;

wherein the at least one communication hole of the first base cloth and the at least one communication hole of the second base cloth are so arranged as not to overlap in a joint direction of the first and second base cloths, and arranged in an alternate fashion in a direction extending along the edges of the base cloths;

wherein the corners of each of the communication holes disposed in the vicinity of the panel-side joints are disposed closer to the second edge of the base cloths than a corresponding one of the panel-side joints; and wherein the corners of each of the communication holes disposed in the vicinity of the center joint are disposed closer to the first edges of the base cloths than the center joint.

6. The airbag of claim 5, wherein opposite inner edges of each of the communication holes which are disposed between the center joint and panel-side joint are formed into straight lines generally parallel to each other.

7. The airbag of claim 5, wherein the center joint and panel-side joints are formed by sewing using sewing threads.

* * * * *